(12) United States Patent
Rose et al.

(10) Patent No.: US 7,334,947 B2
(45) Date of Patent: Feb. 26, 2008

(54) ALIGNMENT SYSTEM AND METHOD (75) Inventors: Andreas Rose, San Macros, CA (US); Guenter Herr, Ehringshausen (DE); Kyle Johnston, Sammamish, WA (US)

(73) Assignee: Ondine International Ltd, St. Michael (BB)

( * ) Notice: Subject to any disclaimer, the term of this patent is extended or adjusted under 35 U.S.C. 154(b) by 0 days.

(21) Appl. No.: 11/549,702

(22) Filed: Oct. 16, 2006

(65) Prior Publication Data
US 2007/0165985 A1 Jul. 19, 2007

Related U.S. Application Data (60) Provisional application No. 60/729,626, filed on Oct. 24, 2005.

(51) Int. Cl.
*G02B 6/36* (2006.01)
(52) U.S. Cl. .......................... 385/90; 385/88; 385/33; 385/92; 385/93
(58) Field of Classification Search ................. None
See application file for complete search history.

(56) References Cited

U.S. PATENT DOCUMENTS

| | | | |
|---|---|---|---|
| 3,936,143 A | | 2/1976 | Sato |
| 5,812,258 A | * | 9/1998 | Pierson ........................ 356/153 |
| 6,339,500 B1 | * | 1/2002 | Carmi et al. ................. 359/399 |
| 6,470,120 B2 | * | 10/2002 | Green et al. ................... 385/52 |
| 6,652,156 B2 | * | 11/2003 | Shinagawa et al. ........... 385/78 |
| 6,935,791 B2 | * | 8/2005 | Ban et al. ..................... 385/90 |
| 2002/0025124 A1 | | 2/2002 | Green |

FOREIGN PATENT DOCUMENTS

| | | |
|---|---|---|
| DE | 23 58 785 A1 | 6/1975 |
| JP | 61 020911 A | 1/1986 |
| JP | 63 083708 A | 4/1988 |
| JP | 01 080917 A | 3/1989 |
| JP | 09 090172 | 4/1997 |

OTHER PUBLICATIONS

International Search Report and Written Opinion dated Feb. 9, 2007. PCT/US06/040936. 1248.033WO.
Haag H., "Development of a High Performance Optical Connector for Monomode Systems" Proceedings of the SPIE-The International Society for Optical Engineering USA, vol. 468, 1984, pp. 15-18, XP008074389, ISSN: 0277-786X.
Tsuchiy A H et al., "Double Eccentric Connectors for Optical Fibers" Applied Optics, OSA, Optical Society of America, Washington, DC, US, vol. 16, No. 5, May 1977, pp. 1323-1331, XP002036658, ISSN: 0003-6935.

* cited by examiner

*Primary Examiner*—Michelle Connelly-Cushwa
*Assistant Examiner*—Chad H. Smith
(74) *Attorney, Agent, or Firm*—Dobrusin & Thennisch PC (57) ABSTRACT

The present invention provides an alignment system comprising a base having a feature that accepts a first optical element, a first eccentric element having a through hole that accepts an eccentric assembly comprising a second eccentric element having a feature that accepts a second optical element and is attached to the second optical element via second attachment means, wherein the first eccentric element is engaged with the base via first attachment means and axial alignment between optical axis of the first optical element and optical axis of the second optical element is achieved by rotationally adjusting at least one of the eccentric elements relative to the base. The present invention also provides methods to make and use this alignment system.

26 Claims, 9 Drawing Sheets

ALIGNMENT SYSTEM AND METHOD

CLAIM OF BENEFIT OF FILING DATE

This application claims the benefit of U.S. Provisional Application Ser. No. 60/729,626 titled: "Alignment System and Method" filed on Oct. 24, 2005.

FIELD OF INVENTION

This invention is intended to serve as a mechanism for aligning a set of components and holding them in an aligned state. Specifically, this invention is intended to provide a system and a method for aligning the axis of at least two optical components, such as a stable alignment between an optical fiber and a laser diode, two optical fibers, or the like.

BACKGROUND OF INVENTION

A typical method of aligning an optical fiber with a laser diode involves a single base unit that has an oversized hole that accepts the laser diode on one side and a fiber optic ferrule on the other. The fiber ferrule is often affixed to the base using a method such as clamping, gluing, welding, etc. Alignment is accomplished by moving the laser diode around in the oversized hole, often with an XY scanning motion, until a suitable alignment condition has been met. The laser diode is then affixed in position using techniques such as glue, solder, laser welding, etc.

In other variations, alignment is accomplished by first affixing the laser diode in position and the fiber position is varied until a suitable alignment is obtained. Various sleeves can be used to help support the fibers and provide increased surface area to aid with the bonding/affixing step. In some applications, a bare fiber is aligned with a bare laser diode die using micro-positioning equipment, and then a drop of solder is melted with a laser and allowed to cool and harden in order to try and capture the fiber in a precise state of alignment.

Most of the conventional techniques are permanent, meaning that attempts to disassemble them can cause permanent damage to some of the components. They also are likely to require expensive, high precision positioning equipment and tooling to conduct the alignment procedure. Finally, although many of the conventional techniques can produce well-aligned assemblies, they often suffer from limited strength due to limited physical overlap of the welded or bonded components. Adhesives are commonly used to bond the components together in an aligned assembly. However, during the cure, out-gassing can damage components and many adhesives shrink when curing, potentially destroying a high precision alignment. Adhesives also have many potential durability issues. Humidity and temperature effects can cause swelling, creeping or loss of strength, resulting in joint failure or loss of alignment. The use of welding as a bonding method avoids some of the issues with adhesives, but can result in dangerously heating the components, requiring complicated and sometimes lengthy procedures to avoid causing damage. Welding is not very compatible with very high precision applications such as single mode fiber alignment because the heat of the welding process can cause enough physical deflection to destroy precise alignments. Soldering techniques used in bonding avoid some issues with adhesives but also suffer from drawbacks associated with the relatively long time it takes molten solder to cool and solidify. High precision alignments can drift or be deflected during the solder cooling process.

SUMMARY OF THE INVENTION

The present invention overcomes the above-discussed disadvantages associated with the conventional alignment techniques. The present invention has the unique capability of being assembled with physical clamping techniques such as screws that allow for a stable assembly but can still be removed for rework, testing or upgrading. It does not generally require expensive, high precision positioning equipment and tooling to conduct the alignment procedure. The present invention does not require limited physical overlap of welded or bonded components and problems associated with them. Instead, the present invention provides mechanical clamping options as well as providing useful bonding locations that are far enough from the critical alignment structures to allow welding to be used to make permanent assemblies without destroying the component alignment. The mechanical rigidity and the large amount of physical overlap in the components allows solder to cool without the issue of mechanical drift and create more robust physical assemblies.

The present invention is an alignment system comprising: a base having a feature that accepts a first optical element; and a first eccentric element having a through hole that accepts an eccentric assembly comprising a second eccentric element having a feature that accepts a second optical element and is attached to the second optical element via second attachment means; wherein the first eccentric element is engaged with the base via first attachment means and axial alignment between optical axis of the first optical element and optical axis of the second optical element is achieved by rotationally adjusting at least one of the eccentric elements relative to the base.

The present invention is also an alignment system comprising: a base having a first through hole that accepts a first optical element; a first eccentric element having a second through hole that accepts an eccentric assembly comprising a second eccentric element having a third through hole that accepts a second optical element and is attached to the second optical element via second attachment means, wherein the first eccentric element is engaged with the base via first attachment means and axial alignment between optical axis of the first optical element and optical axis of the second optical element is achieved by rotationally adjusting at least one of the eccentric elements relative to the base.

Once the components of the system are aligned, the system 100 provides the ability to rigidly lock all the components in their aligned positions resulting in a long-term stable and rigid assembly. This type of assembly, when involving a laser diode aligned with a fiber optic element, is often commercially referred to as a pigtail assembly. This lock ability is provided by securing or clamping down the first attachment means to the base. The clamping action also causes features in the first eccentric element to securely engage with features on the second eccentric element allowing all the components to be secured in place.

An objective of the present invention to align sets of objects with sub-micron precision. However, the present invention can be used to align sets of objects that do not require sib-micron precision.

Another objective of the present invention is to provide physically strong alignment between components even when accompanied with physical shocks and rough handling.

A further objective of the present invention is to provide a stable alignment that can be maintained over a large range of environmental conditions, especially over a range of temperatures.

Another objective of the present invention is to decrease the time required for alignment.

A further objective of the present invention is to allow the operator to adjust the alignment using simple and readily available tools (e.g., bare fingers, wrenches, or the like).

Another objective of the present invention is to allow simple automation equipment to complete the alignment procedure.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings.

DETAILED DESCRIPTION OF THE INVENTION

The above-described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

The Alignment System

Referring to FIGS. 1-7 the present invention provides an alignment system 100 comprising the following components: a base 10 having a feature (e.g., first through hole 12 as shown in FIGS. 1-7) that accepts a first optical element 14; a first eccentric element 18 having a second through hole 20 that accepts an eccentric assembly 22, the first eccentric element 18 engaged with the base 10 via first attachment means 24. The eccentric assembly 22 includes a second eccentric element 26 having a feature (e.g., third through hole 28 as shown in FIGS. 1-7) that accepts a second optical element 30 and is attached to the second optical element 30 via second attachment means 32. Axial alignment between optical axis of the first optical element 14 and optical axis of the second optical element 30 is achieved by rotationally adjusting at least one of the eccentric elements (18, 26) relative to the base 10. Once alignment is achieved, the adjustment position can be fixed using the first attachment means 24. Below is a more detailed description of the components of the system 100.

First Optical Element: The first optical element 14 can be any suitable art-disclosed optical element such as a laser diode, an optical fiber, a LED, a lens, a mirror, an optical sensor chip, a holographic optical element, or the like. A laser diode is shown as the first optical element 14 in FIGS. 1-3

Figure 2:
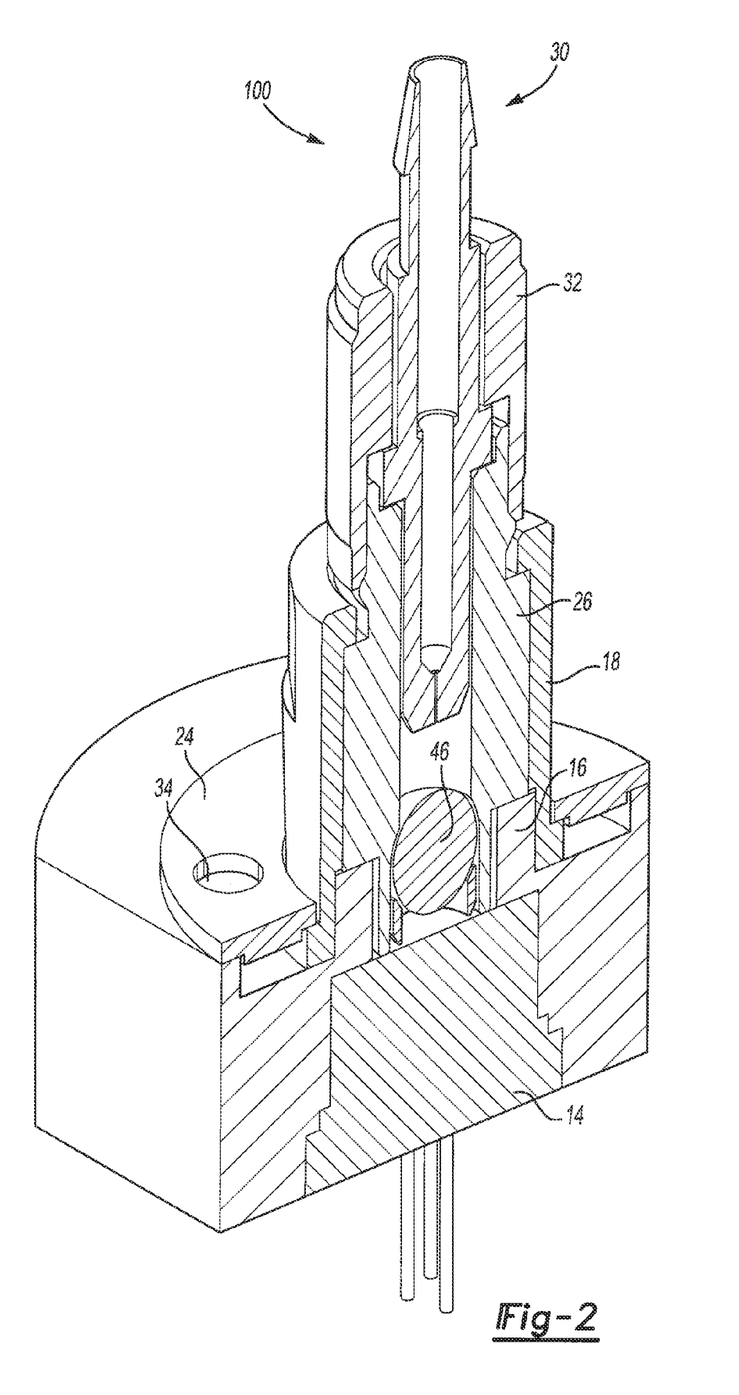
FIG. 2 is a cross section view of the optical alignment system shown in FIG. 1.
Figure 3:
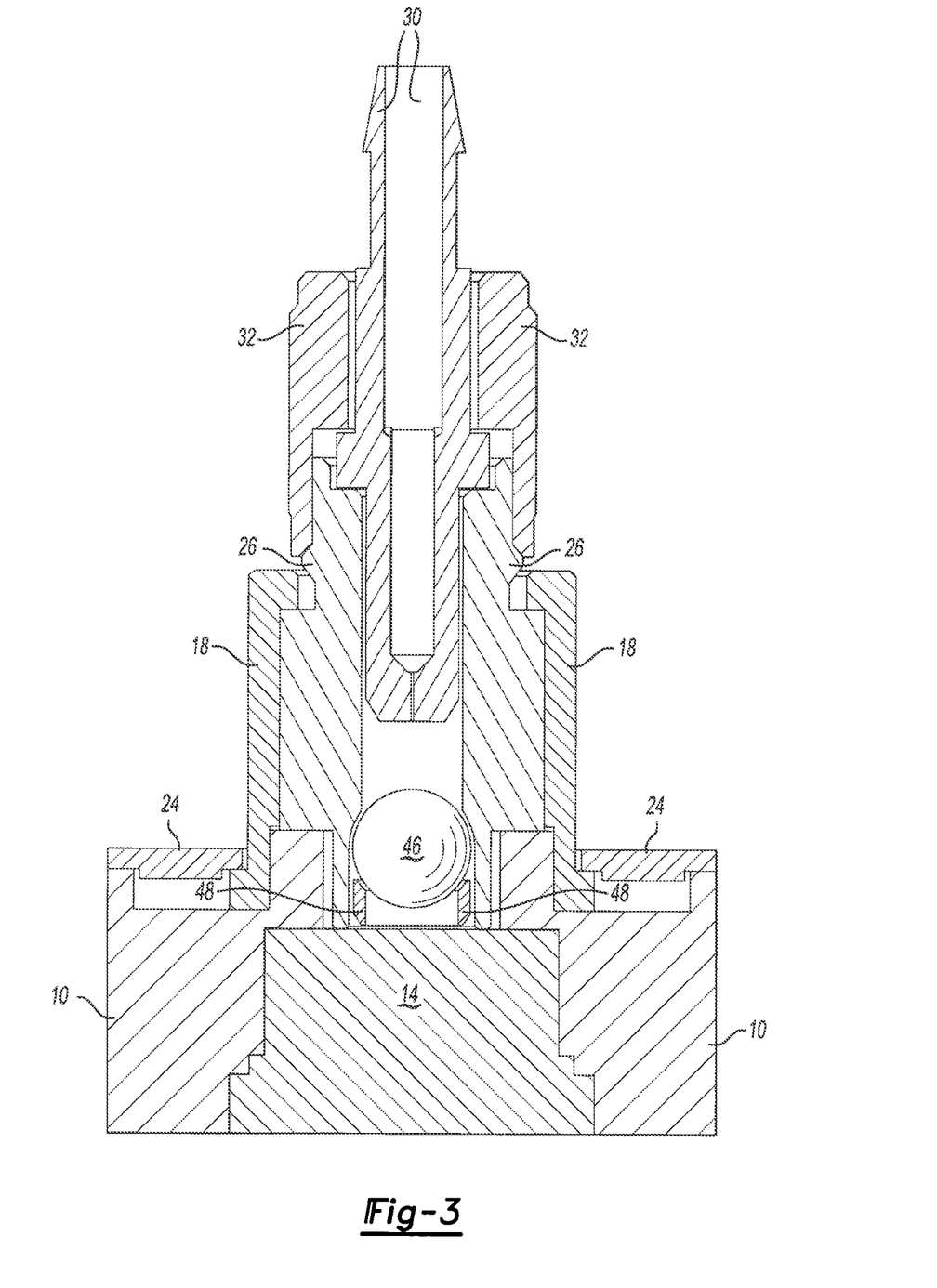
FIG. 3 is another cross section view of the optical alignment system shown in FIG. 1.
Figure 4:
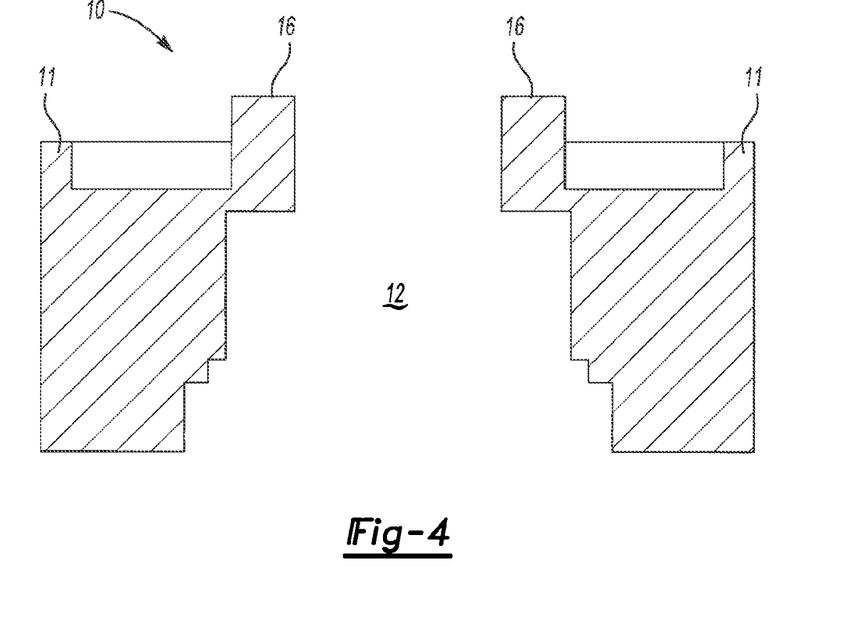
FIG. 4 is a cross section view of the base shown in FIG. 1.
Figure 5:
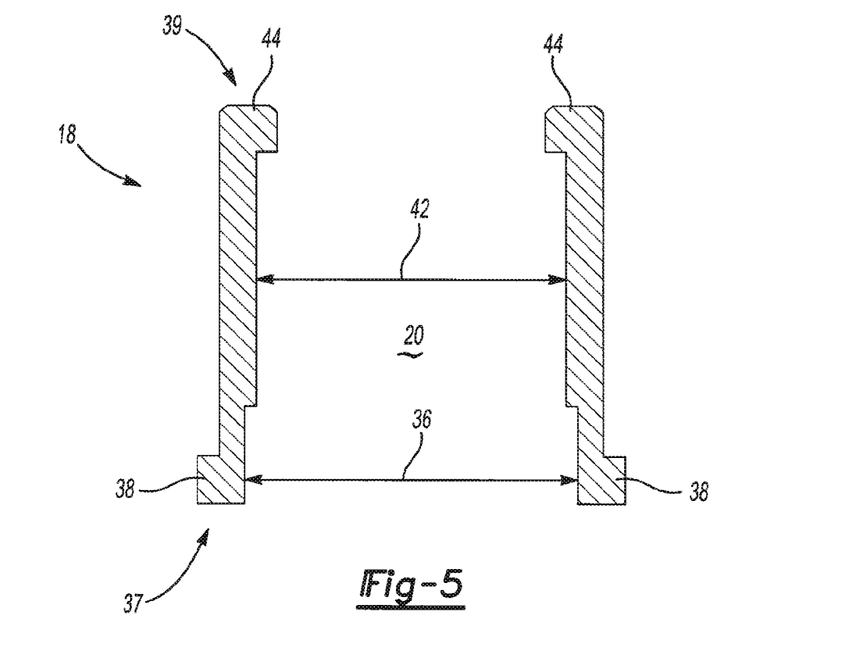
FIG. 5 is a cross section view of the first eccentric element shown in FIG. 1.

Base: The base 10 serves as a rigid platform for the whole assembly of components of the system 100. Typically, it may have features that allow it to be affixed to other structural components. These features may include, without limitation, flanges for clamping, thru holes to allow passage of a bolt or threaded holes to accept a bolt. Referring to FIGS. 2-4, the base 10 has a suitable art-disclosed feature (e.g., such as the first through hole 12 shown in FIGS. 2-4, a pocket, a cavity, or the like) on one side that accept the first optical element 14. This feature (e.g., the through hole 12) allows light from the first optical element 14 to be exchanged with other components within the system 100.

The first optical element 14 should be affixed into the base 10 by techniques that include, but are not limited to, clamping, bolting, soldering, welding or gluing. There can be features in the base 10 that assist in the mounting of the first optical element 14 such as, without limitation, holes for injecting glue, rough surfaces to aid in bonding with the glue, or tapped holes for clamping bolts. Referring again to FIGS. 2-4 and on the other side of the base 10 from the first optical element 14, a raised collar 16 is preferably provided. The outer diameter of the raised collar 16 is the feature that engages with the first eccentric element 18. It is preferred that the tolerances of the various features should be tight enough to ensure that the optical axis of the first optical element 14 will be mounted within about 0.100 mm of the axis of the outer surface of the raised collar 16. It is possible to design for looser tolerances by adjusting the amount of eccentricity in the first eccentric element 18 and the second eccentric element 26.

It is preferred that the base 10 also has features that engage with the first attachment means 24 and serve to clamp or attach the first eccentric element 18 firmly to the base 10. It is preferred that the base 10 has an raised outer lip 11 such that the attachment means 24 engages the base 10 on its outer edge and the first eccentric element 18 in its inner edge with an unsupported area in between. The base 10 is preferred to have features that allow the attachment means 24 to be rigidly affixed down using techniques that include, but are not limited to, clamping, bolting, soldering, welding or gluing. It is preferred that tapped holes (i.e., through holes) are provided such that bolts run through the attachment means 24 can be used to exert clamping pressure on the attachment means 24 and thereby clamp the first eccentric element 18 down.

It should be noted certain first optical element 14 might require temperature control. Therefore, the base 10 may preferably have features such as a hole to mount a temperature sensor. Further, there may also preferably be mounting features such as large flat facets that allow efficient coupling to a cooling or heating mechanism such as a thermoelectric cooler. If temperature control is desired, constructing the base 10 with a temperature stable material that has high heat conductance may be preferable.

Figure 1:
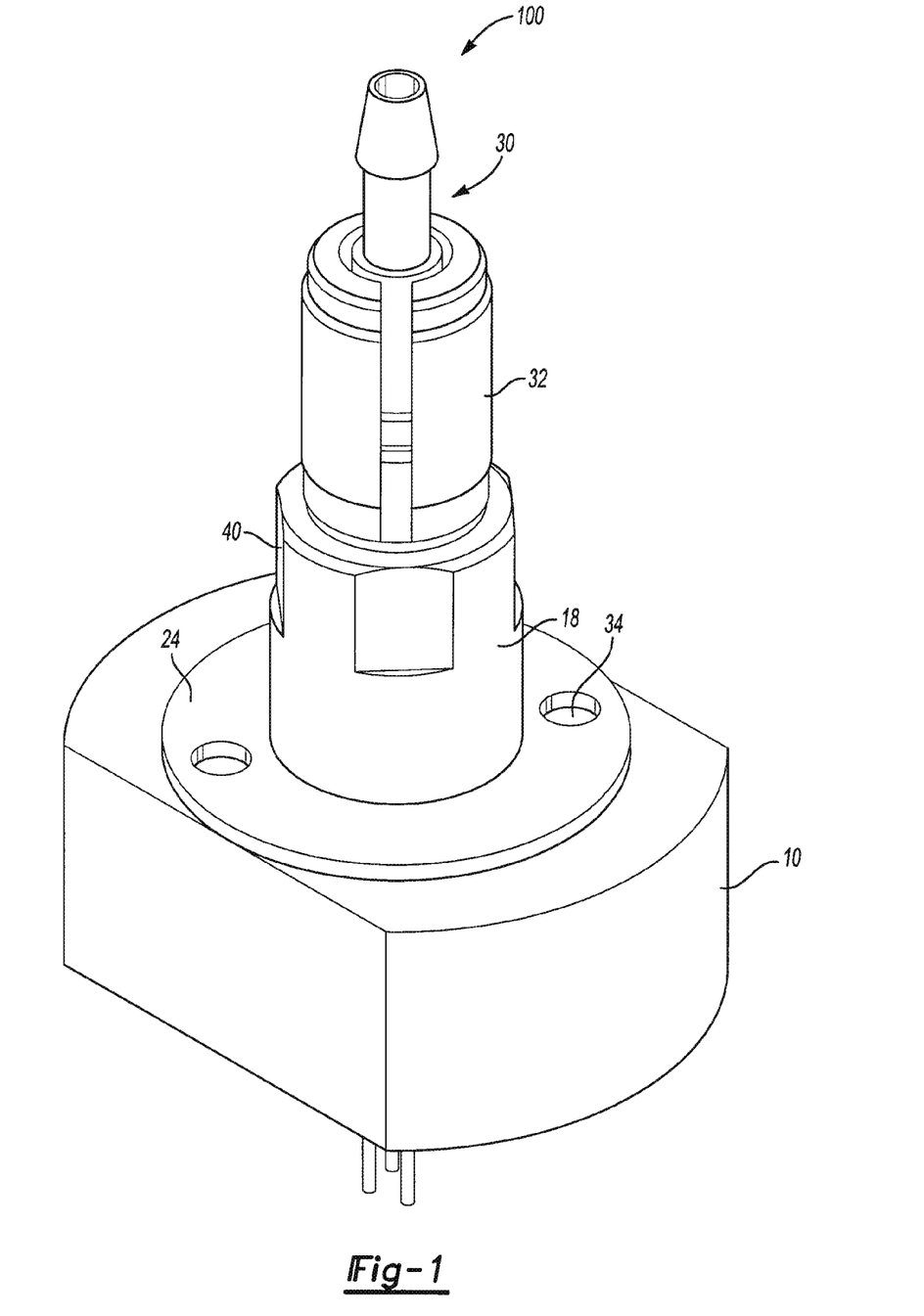
FIG. 1 is a perspective view of an exemplary embodiment of the optical alignment system in accordance with the principles of the present invention.

First Attachment Means: The attachment means 24 engages with both the base 10 and the first eccentric element 18. In a preferred embodiment as shown in FIGS. 1-3, a clamp washer having two through holes 34 forms part of the attachment means 24. The through holes 34 are provided to allow the clamping bolts (not shown) to pass through the clamp washer and into the base 10. When the bolts are tightened, the downward pressure serves to clamp the first eccentric element 18 securely in place. To assist with generating this clamping pressure, it is preferred that an unsupported region between the outer and inner edges of the clamping washer is provided. Preferably, a slight cupping of the clamping washer will form a slight spring to provide additional clamping pressure and better engagement along its inner and outer edges. This spring effect is also helpful during the alignment process. The clamping bolts can be slightly tensioned, providing enough clamping force to keep the first eccentric element 18 from freely rotating while still allowing rotation if enough rotation force is used. Although many different types of material could be used to form the attachment means 24, it is preferred to construct it a corrosion resistant spring steel alloy.

Although the preferred embodiment shown in FIGS. 1-2 of the system 100 utilizes clamping bolts (not shown) to affix down the clamping washer, other methods can be used to complete the attachment means 24 such as gluing down, welding down, soldering down and even the possibility of using press fit components and press tool such as an arbor press, or the like. It is also possible that the clamping washer could be threaded along an outer edge and engaged into corresponding threads on the base 10. Then, when the clamping washer is rotated, it would travel towards the base 10 and provide clamping pressure to the first eccentric element 18.

If an external adjustment mechanism is utilized during alignment, it is also possible use art-disclosed external mechanism as the first attachment means 24. The external mechanism would have to hold the entire system 100 in an aligned state and provide clamping pressure to the first eccentric element 18 while an affixing technique such as welding, soldering or gluing was used to immobilize the components.

First Eccentric Element: Referring to FIGS. 1-3 and 5, the first eccentric element 18 with its second through hole 20 contains features that mechanically engage with both the base 10 and the eccentric assembly 22. It is also preferred that the first eccentric element 18 has features that allow it to lock down the position of the eccentric assembly 22 when it is locked down by the first attachment means 24. As discussed in detail below, the first eccentric element 18 provides one of the required eccentric offsets as well as one of the axis of rotation required for the alignment process. It is preferred that the second through hole 20 is stepped and has an inner diameter on a first section 36 that engages with the outer diameter of the raised collar 16 on the base 10. There is sufficient mechanical overlap between the raised collar 16 and the first section 36 to create a physically coupling. The tolerances are such that the first eccentric element 18 can freely rotate on the raised collar 16 without significant lateral shifting (rattling). The outer surface of one end 37 of the first eccentric element 18 has an outward lip 38 that provides a feature for the first attachment means 24 to engage with. It is preferred that the outer surface 40 of the other end 39 of the first eccentric element 18 has flat facets (as shown in FIG. 1) on it to facilitate gripping with fingers or a wrench. Alternatively, the outer surface 40 could have various surface treatments including, but not limited to knurling, sand blasting or a polymer overlay material (e.g., silicon rubber or the like). The inner diameter of a second section 42 engages with an outer cylindrical surface of the eccentric assembly 22. The tolerances are such that the eccentric assembly 22 can rotate freely without significant lateral shift. The axis of the second section 42 is eccentric with respect to the axis of the first section 36. This eccentric offset can be any desirable range. It is preferred that this eccentric offset is between about 0.025 mm to about 1 mm, more preferably at about 0.050 mm. Inside surface lip 44 of the second through hole 20 provide a section that is concentric with the second section 42 and has a diameter that allows free clearance for one end of the eccentric assembly 22 to pass through. When the first eccentric element 18 is translated along its axis towards the base 10 (e.g., by the clamping pressure form by the first attachment means 24), the inside surface lip 44 engages with a feature on the eccentric assembly 22, transmitting the clamping pressure. Please note that when clamping pressure is applied, the physical tolerances are such that the inside surface lip 44 firmly engages with the eccentric assembly 22 before the end 37 bottoms out on the base 10. In this fashion, all the components of the system 100 are clamped by the single clamping mechanism. If the end 37 was allowed to bottom out on the base 10, the eccentric assembly 22 would be not be firmly affixed and could mechanically drift out of alignment.

Eccentric Assembly: Referring to FIGS. 1-3 and 6, the eccentric assembly 22 includes a second eccentric element 26 having a suitable art-disclosed feature (e.g., such as the third through hole 28 shown in FIGS. 1-3 and 6, a pocket, a cavity, or the like) that accepts a second optical element 30 and is attached to the second optical element 30 via second attachment means 32. The second attachment means 32 can be any suitable art-disclosed means for attachment including, but not limited to, a nut shown in FIGS. 1-3 and 6. It is preferred that the eccentric assembly 22 also contains ball lens 46 positioned inside the third through hole 28 and retained there by a retaining ring 48. The ball lens 46 is optionally included to facilitate collecting light emitted from the first optical element 14 and re-imaging it into the second optical element 30. When the ball lens 46 is present, the optical axis of the eccentric assembly 22 is determined by the optical axis of the second optical element 30 after it has been refracted by the ball lens 46. Without the ball lens 46, the optical axis of the eccentric assembly 22 is determined solely by the second optical element 30. However, in either case, once the second attachment means 32 is attached (e.g., clamped down or the like), the entire eccentric assembly 22 will have one fixed optical axis.

Second Eccentric Element: As discussed below, the second eccentric element 26 has features that mechanically engage with both the first eccentric element 18 and the second optical element 30. The second eccentric element 26 provides one of the required eccentric offsets as well as one of the axis of rotation required for the alignment process. Additionally, the second eccentric element 26 has features that allow it to bottom out and engage with the base 10 when clamping pressure is applied through the first eccentric element 18. It is preferred that the second eccentric element 26 has features that allow the second attachment means 32 to firmly secure the second optical element 30 in place. The second eccentric element 26 also allows the ball lens 46 to be securely mounted in the third through hole 28.

Figure 7:
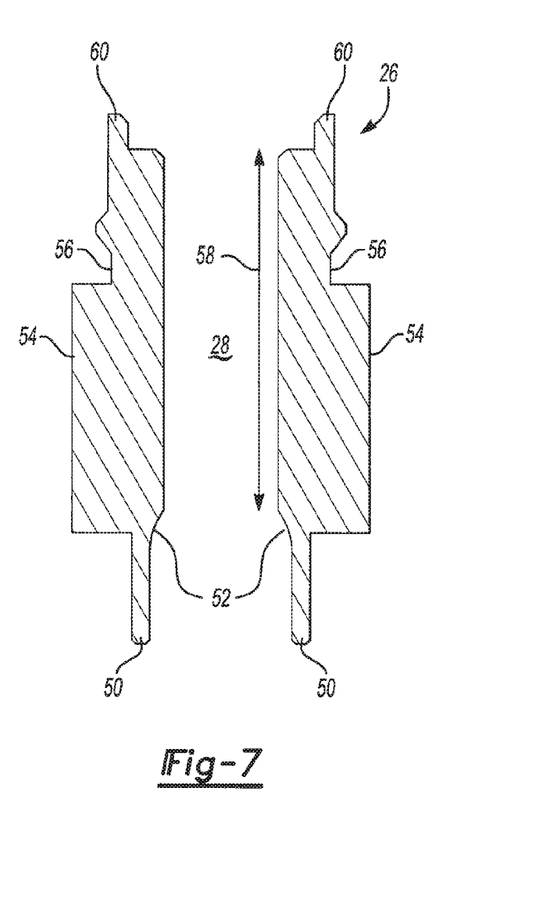
FIG. 7 is a cross section view of the second eccentric element shown in FIG. 1.

Referring to FIGS. 2-3 and 7, on one end of the second eccentric element 26 is a reduced diameter section hereinafter called nose 50 that fits inside the first through hole 12 of the base 10. The tolerances are such that the maximum lateral offset during alignment will not cause the nose 50 to hit the side of the first through hole 12. The nose 50 engages firmly with the base 10 when clamping pressure is applied by the first eccentric element 18. Optionally, it is possible to provide a rough surface on mating surfaces on either or both the second eccentric element 26 or the base 10 in order to provide increased surface friction that enhances the security of the physical clamping process. It is preferred that area of the third through hole 28 within the nose 50 has a diameter wide enough to accept the ball lens 46. It is also preferred that there exist a reduction in the diameter of the third through hole 28 so as to form an inside lip 52 that engages the ball lens 46. The retaining ring 48 that is permanently press fit into the third through hole 28 engages the other side of the ball lens 46 and clamps it firmly against the inside lip 52. A first section 54 of the outer surface of the second eccentric element 26 has a diameter that engages with the second section 42. The tolerances are such that the second eccentric element 26 can rotate freely inside the first eccentric element 18 without significant lateral offset. The long engagement length between the first eccentric element 18 and the second eccentric element 26 helps create a physically strong and stable assembly when clamping.

Referring again to FIGS. 2-3 and 7, on other end of the second eccentric element 26 is a reduced section 56 having a smaller diameter that passes through the second through hole 20. The reduced section 56 includes a surface that engages firmly with the inside surface lip 44 when clamping pressure is applied. Optionally, it is possible to provide a rough mating surfaces on the first eccentric element 18 and/or the second eccentric element 26 in order to provide increased surface friction that enhances security of the physical clamping process. The axis of the reduced section 56 is eccentric with respect to the axis of the first section 54. This eccentric offset can be any desirable range. It is preferred that this eccentric offset is about 0.025 mm to about 1 mm, more preferably at 0.050 mm. It is preferred that the second eccentric element 26 has features (e.g., threads or the like) that assists attachment to the second attachment means 32.

Figure 6:
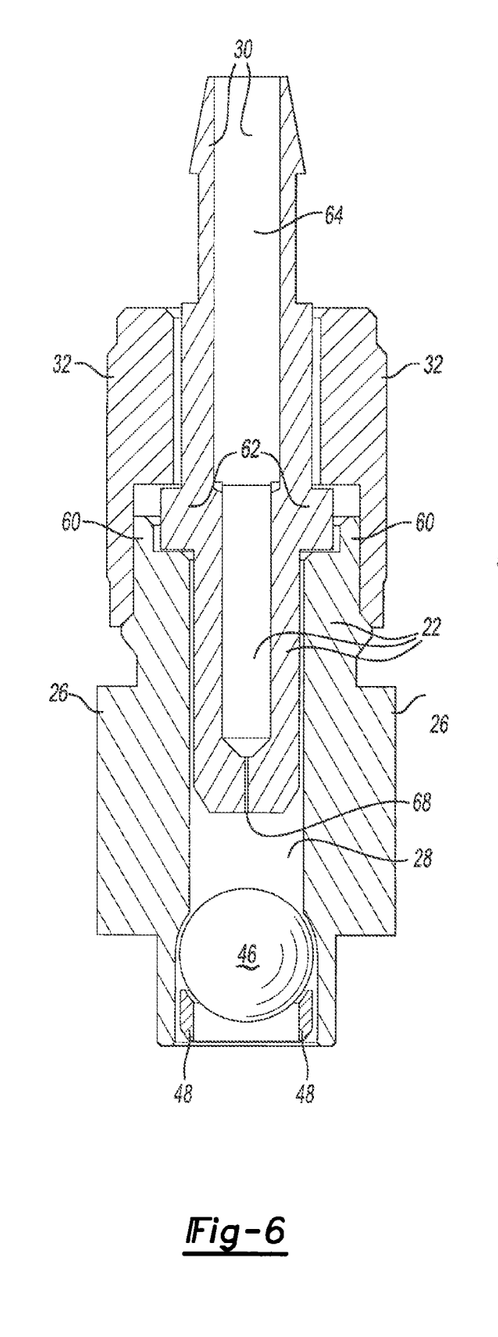
FIG. 6 is a cross section view of the eccentric assembly shown in FIG. 1.

Referring to FIGS. 6-7, the third through hole 28 extends through the center of the second eccentric element 26. The axis of the center section 58 of the second through hole 28 is eccentric with respect to the axis of the first section 54 in the preferred embodiment. The eccentric offset can be any desirable range. The third through hole 28 has a diameter that can accept the second optical element 30. It is preferred that an end section of the third through hole 28 hereinafter called end lip 60 has a slightly increased diameter that forms a pocket which accepts flange 62 of the second optical element 30. The lip 60 has a surface that engages with the flange 62 when clamping pressure is applied by the second attachment means 32.

Second Optical Element: Referring to FIGS. 2-3 and 7, the second optical element 30 preferably includes a fiber ferrule 64 with an optical fiber (not shown) adhered in place. However, the second optical element can be any suitable art-disclosed optical element such as a laser diode, an optical fiber, a LED, a lens, a mirror, an optical sensor chip, a holographic optical element, or the like. The optical fiber is polished at the face of the fiber ferrule 64. The fiber ferrule 64 has a long nose section with a diameter that fits into the third through hole 28. The fiber ferrule 64 also has flange 62 that engages with the third through hole 28. The flange 62 creates a reference surface so that the fiber ferrule 64 can be polished to a precisely controlled length. In this fashion, an end 68 of the optical fiber can be located the correct distance from the ball lens 46 to ensure optimum conditions for coupling light from the first optical element 14

Optionally, the fiber ferrule 64 can be of any standard commercial variety, such as, without limitation, an ST, an FC, an SMA or even a custom form factor. It is recommended that the fiber ferrule 64 is firmly affixed to the second eccentric element 26, the optical fiber is set at a correct distance from the ball lens 46, and the combination of the eccentric offsets in the first eccentric element 18 and the second eccentric element 26 is sufficiently large enough to successfully align the axis of the optical fiber with the axis of the first optical element 18.

Second Attachment Means: The second attachment means 32 can be any suitable art-disclosed means used for attachment including, but is not limited to, the nut shown in FIG. 7. In the preferred embodiment and referring to FIGS. 1-3 and 6, the nut engages with threads on the outer diameter of the second eccentric element 26 and securely clamps then second optical element 30 in place. The nut also has a split section that allows it to be placed onto a patch cord with a fiber ferrule on both ends. The outer surface of the nut has a knurled finish to facilitate gripping/turning with fingers. Alternatively, the outer surface could have various surface treatments including, but not limited to facets for a wrench, sand blasting or a polymer overlay material (e.g., silicon rubber or the like). It is not required to have a split in the nut if the nut is placed on the optical fiber patch cord before the fiber ferrules are adhered on.

Various materials can be used to manufacture the base 10, the first eccentric element 18, and/or the second eccentric element 26. For strength, long-term stability and the ability to be machined to tight mechanical tolerances, a metal such as a steel alloy is preferred. However, without limitation, other materials such as ceramic, glass filled epoxy, plastics and softer metal alloys such as aluminum and brass can also be used. Moreover, the cost of producing component can be kept low by utilizing high volume, low cost manufacturing methods such as molding and CNC techniques.

A proper alignment of the system 100 allows the maximum amount of light from the first optical element 14 to be coupled through the ball lens 46 and into the second optical element 30.

Conceptual Basis of the Alignment System

Figure 8:
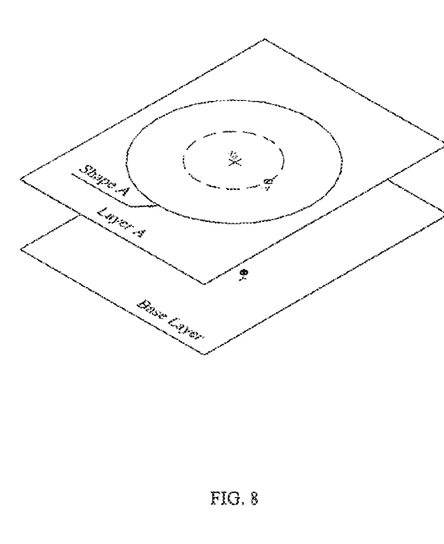
FIG. 8 is an isometric view of a conceptual system in accordance with the principles of the present invention with one degree of freedom.
Figure 9:
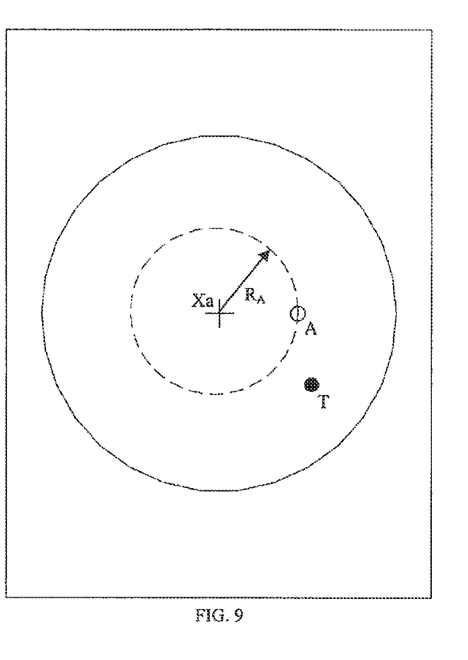
FIG. 9 is a top view of the conceptual system shown in FIG. 8.
Figure 10:
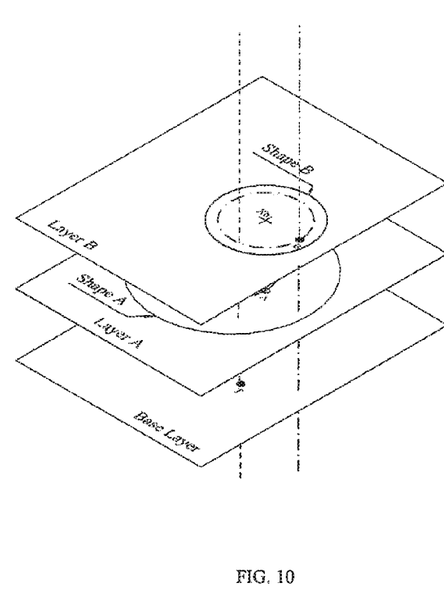
FIG. 10 is an isometric view of another conceptual system in accordance with the principles of the present invention with two degree of freedom.

In order to understand how a pair of eccentric elements work together to allow a high precision alignment presented in the system 100, it helps to first examine the limitations of a conceptual system with only one degree of freedom. FIGS. 8-9 shows a system with two laminar layers, a Base Layer and Layer A. Although shown as separated for clarity, these layers can be considered as actually coplanar. On the Base Layer is a target (Point T). On Layer A is an arbitrary shape, Shape A, shown as circle. Shape A has a center of rotation (shown as Xa in the center of Shape A). Located somewhere on Shape A is Point A that is not coincident with Point Xa. We want to align Point A with Point T. The allowed degree of freedom allows Shape A to be rotated around Point Xa to some angle qA. Sweeping qA through 360° will sweep Point A on a path with the locus of possible positions defining the perimeter of a circle centered on Point Xa with a radius RA equal to the distance from Point Xa to Point A. If Point T happens to land on the path swept out by Point A, the system can be aligned. Otherwise, as shown in FIG. 10, another degree of freedom is needed to complete the alignment. Note that if the Point A is coincident with Point Xa, then the locus of possible positions degenerates from a circle to a single point and no adjustment of the position of Point A is achieved by rotating Shape A.

A conceptual system with the same two degrees of freedom possessed by the system 100 is shown in FIGS. 10-13. The system 100 can be considered as consisting of three layers, a Base Layer, a Layer A and a Layer B. For clarity, the three layers are shown as separate but can be considered as coplanar. The Base Layer has a target (Point T) and Layer A has an arbitrary shape, Shape A (shown as a circle) with a center of rotation Xa (shown in the center of Shape A). Layer A has a Point A that is not coincident with Point Xa for the same reasons discussed previously. The third layer, Layer B also contains an arbitrary shape, Shape B (also shown as a circle). There is a Point B located somewhere in shape B that we want to align with Point T. Shape B has a center of rotation Point Xb (shown in the center of Shape B) that is not coincident with Point B for the same reasons discussed previously. There is an additional constraint that Shape B is affixed to Shape A such that its axis of rotation through Point Xb must pass through Point A. This means that if Shape A is rotated, Point Xb will follow Point A. However, Shape B is free rotate independently around Point Xb.

Figure 11:
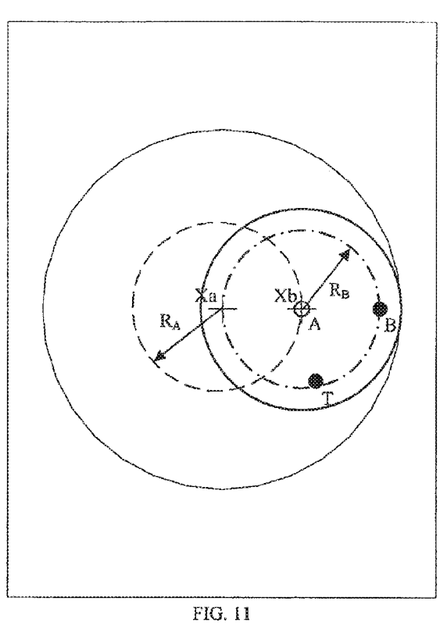
FIG. 11-13 are top views of the conceptual system shown in FIG. 10.

As shown in FIGS. 10-11, when Shape A is rotated around Point Xa, Point A will be located on a path defined by a circle centered on Point Xa with a radius RA equal to the distance from Point Xa to Point A. For any position of Point A, rotating Shape B results in Point B being located on a path defined by the perimeter of a circle centered on Xb with a radius RB equal to the distance from Xb to Point B. The full locus of all possible positions of Point B can therefore be generated by sweeping Point B through all possible positions generated by the rotation of Shape B for all possible positions of Point A generated by the rotation of Shape A.

Figure 12:
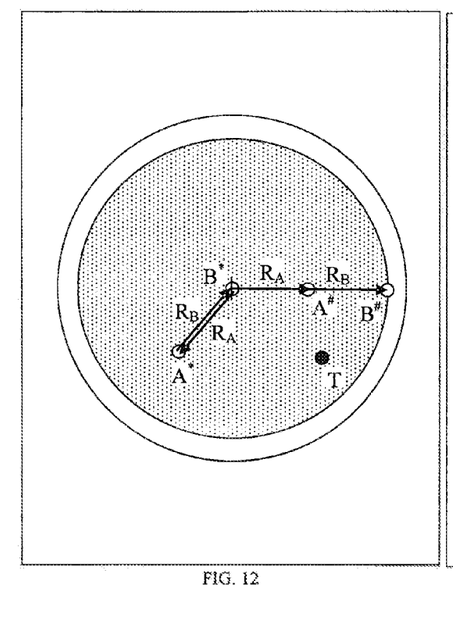
Figure 13:
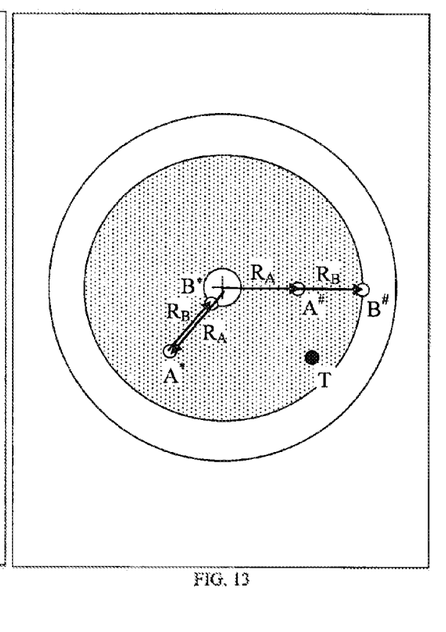

As shown in FIGS. 12-13, the resulting final position of Point B can be predicted using the vector addition of $R_A$ and $R_B$. The maximum extent of the locus of the possible position for Point B is when Point A and Point B fall on a line, shown as $A^\#$ and $B^\#$. The locus of possible location for Point B is then shown as the shaded the area of the circle centered on Point Xa with a radius $R_{Locus}=R_A+R_B$. There are several special conditions for predicting how close Point B can be located relative to the center of rotation, Point Xa. When $R_A=R_B$, Point B can just be placed coincident with Point Xa. This is shown as the vector subtraction of the vectors connecting A* and B*, resulting in a vector of zero length. As shown, when $R_A>R_B$, there is a central zone centered on Point Xa with radius $R_{Missing}=R_A-R_B$ that defines locus of position that Point B cannot reach. However, when $R_A<R_B$ there is no central Missing Zone because Point B can be effectively positioned on the far side of Point Xa from Point A. One implication of this is that there is at least one combination of positions for Point A and Point B to address each location in the locus zone but that for many locations there are redundant combination of Point A and Point B locations that will allow a successful alignment.

The preceding example shows conceptually how the two axis of rotation provided by the present invention provide the two degrees of freedom required to align two coplanar points. Note that when aligning optical components, it is often necessary to align the optical axis of the various components. FIG. 10-11 shows that the layers need not necessarily be coplanar for the invention to be used to allow the alignment of the optical axis of sets of components. The concepts shown in FIG. 10-11 are directly represented in the system 100 shown in FIGS. 1-7 in the following manner:

The base 10 is represented by the Base Layer;
The first eccentric element 18 is represented by Layer A;
The second eccentric element 26 is represented by Layer B;
The optical axis of the first optical element 14 is equivalent to the axis through the Target Point T;
The center axis of the portion of the second through hole 20 that engages with the base 10 is represented by Point Xa;
The offset center axis of the portion of the second through hole 20 that engages with the second eccentric element 26 is represented by Point A;
The center axis of the portion of the second eccentric element 26 that engages with the first eccentric element 18 is represented by Point Xb; and
The offset center axis of the optical fiber is represented by the axis through Point B. Therefore, it is rotary adjustment between the first eccentric element 18 and the base 10 combined with rotary adjustment between the second eccentric element 26 and the first eccentric element 18 that allows the system 100 to be used to align the optical axis of the optical fiber with the optical axis of the first optical element 14. It is the amount of eccentric offset between the two axis in the first eccentric element 18 combined with the amount of eccentric offset between the two axis in the second eccentric element 26 that determine how much adjustment the system 100 is capable of.

Operation of the Alignment System

There are a multitude of techniques for aligning the system 100 described above. For example, a preferred process starts with rigidly mounting the system 100 with the second attachment means 32 firmly locked down and only a very light clamping pressure on the first attachment means 24. The other end of the optical fiber is attached to a light meter and the first optical element 14 is powered up. The second attachment means 32 is gripped with a pair of fingers from one hand and the first eccentric element 18 is gripped with the second hand. The second attachment means 32 is held such that the eccentric assembly 22 is not allowed to rotate and the first eccentric element 18 is rotated until the maximum power through the optical fiber is achieved. Then the first eccentric element 18 is held without rotation while then second attachment means 32 is used to rotate the eccentric assembly 22 until a new maximum power through the optical fiber is achieved. From this point, very small rotational adjustments are first made to one of eccentric elements (18 or 26) and then the other eccentric elements (18 or 26), always in the direction of increasing power through the optical fiber. This will allow an operator to achieve the alignment, which yields the maximum total power through the optical fiber in a very short span of time using only very simple tools. Once the optimum alignment has been achieved, the alignment is locked down by the first attachment means 24 (i.e., by torquing down the bolts through the clamping washer).

Alternative Embodiments of the Present Invention

Figure 14:
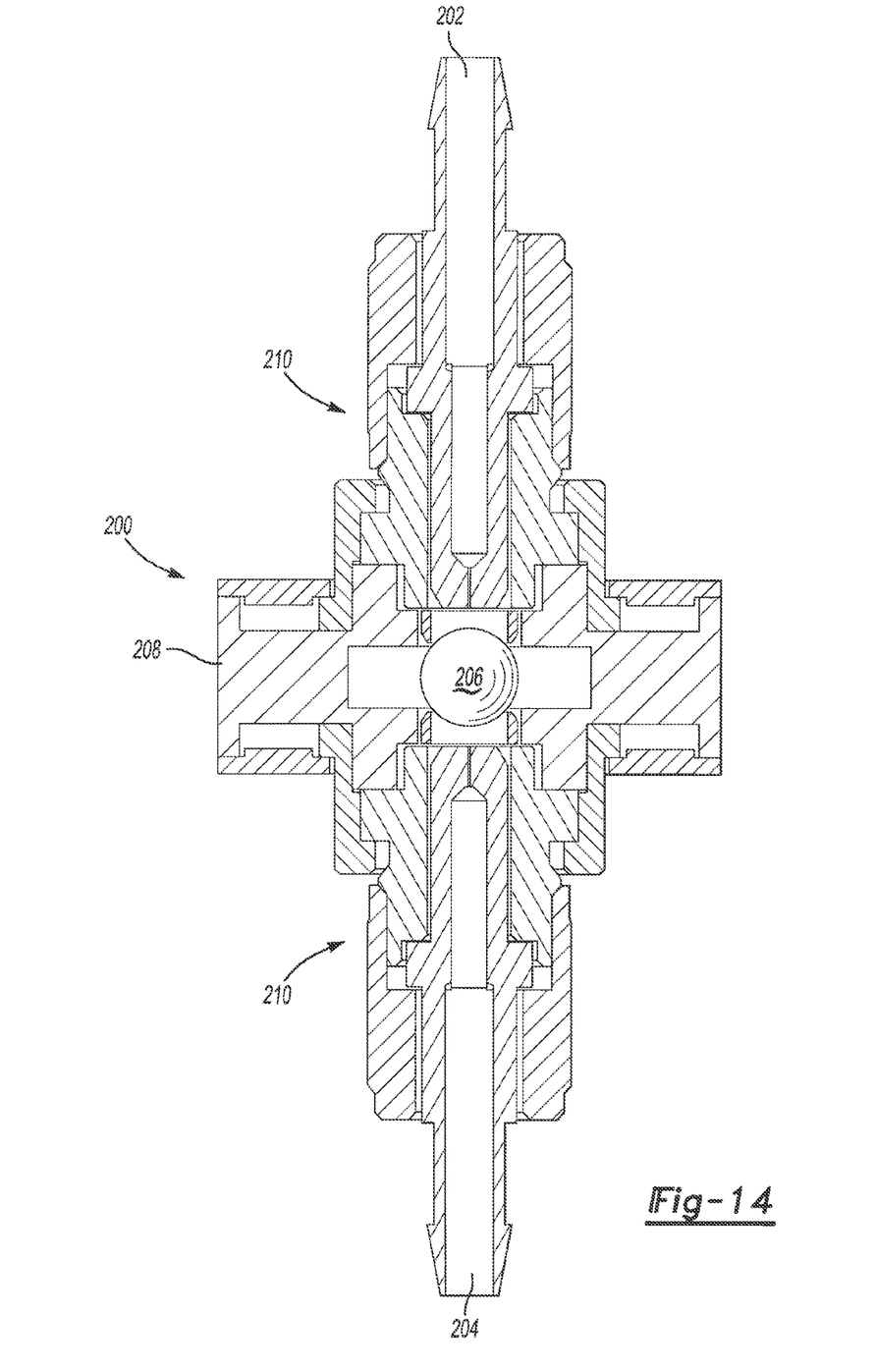
FIG. 14 is a cross section view of another exemplary embodiment of the optical alignment system in accordance with the principles of the present invention.

The present invention can also be used to align more than two sets of components. For example and referring to FIG. 14, the present invention provides another alignment system 200 where two optical fibers (202, 204) are aligned with a ball lens 206 between them. The ball lens 206 is affixed to a base 208 and an optical assembly 210 is affixed to each end of the base 208 to align the optical fibers (202, 204). The optical assembly 210 is constructed in the same fashion as the system 100 described above except that there is no first optical element 14.

There are other aspects of this invention that someone skilled in the art could modify while still keeping within the scope of this invention. One possible modification is to change the type of concentric engagement surfaces used to provide rotational motion. For example, in system 100 as shown in FIGS. 1-3, the lip 38 of the first eccentric element 18 is placed over the raised collar 16 in the base 10. One possible alternative to this design would be to have the first eccentric element 18 to include a nose that fits into the first through hole 12 of the base 10. This would achieve the same alignment mechanism in a slight different manner than the system 100 shown above but would still be within the scope of the present invention.

Other engagement surfaces could also be swapped in a similar fashion while remaining in the scope of the present invention. Another example would be to modify the system 100 such that the second eccentric element 26 engaged on the outside of the first eccentric element 18 instead of on the inside. This could work equally as well as the preferred embodiment shown in FIGS. 1-3, especially if the base 10 was modified so the ball lens 46 was affixed to the base 10 instead.

The present invention can also be useful when the optical axis of the components is not perfectly parallel. If the ball lens 46 was slightly off center with respect to the axis of the second optical element 30 in the system 100, the new optical axis coming out of the ball lens 46 would not be precisely parallel to the axis of the first optical element 14. However, the invention would still allow the components to be aligned such that the maximum power from the first optical element 14 was coupled into the second optical element 30. This ability could be exploited to align systems where one or more of the elements are deliberately mounted in a tipped fashion in order to minimize back reflections back into the optical path.

It would also be within the scope of the present invention if different elements were utilized or the same elements were utilized in a different order than in the preferred embodiments shown above. For instance, the second optical element 30 could be firmly affixed in the base 10 and the position of the first optical element 14 could be adjusted by mounting the first optical element 14 in the second eccentric element 26. Or, a detector can be the first optical element 14 instead of the laser diode shown in FIGS. 1-3, making a fiber optic receiver assembly instead of a laser to optical fiber coupler assembly. The long list of alternate components and arrangements listed prior are all examples of different applications that can utilize the present invention.

Furthermore, some of the components in the system 100 could also be modified while still keeping within the scope of the present invention. For instance, the second eccentric element 26 could be modified to provide facets for attaching a wrench, similar to those on the first eccentric element 18. This would allow the operator to use a pair of wrenches instead of using finger to align the assembly. In certain cases, some of the components in the system 100 could be omitted while still keeping within the scope of the present invention. As mentioned above, it is possible to construct the system 100 without the clamping washer serving as the first attachment means 24 if an external alignment tool is used and a bonding or welding process is used to lock the components together as the first attachment means 24. It is also possible to make a single component that fill the role of the entire eccentric assembly 22 by creating a second eccentric element 26 that has the second optical element 30 built in. It is also possible to modify the features of the components to make them compatible with the requirements of suing a machine to conduct the alignment and lock down process. All of these modifications would clearly still be in the scope of the present invention.

Applications for the Present Invention

The present invention can be used in a wide range of different applications for aligning and affixing many types of components together. In addition to aligning multimode optical fibers to laser diodes as shown in FIG. 1. The present invention can also be used to align single mode optical fibers with laser diodes, optical fibers with optical fibers, or the like. Other embodiments of the invention can be used in many other types of typical optical and mechanical alignment applications. The present invention also can be used to align and/or affix other optical elements such as LEDs, lasers, light bulbs, lenses, sensors, holographic optical elements, diffractive optics, apertures or the like. Additionally, there are situations where many different types of detectors may require alignment with an optical system such as linear arrays, area arrays, position sensitive detectors, single element detectors, or the like. This invention has utility in aligning many different optical assemblies such as aligning fibers with lenses, fibers with sensors, lenses with sensors, or the like.

Furthermore, the utility of the present invention is not limited to the field of optics. The field of mechanics provides additional examples of situations where components can be aligned using this invention. For example, when a shaft encoder is coupled to rotating shafts, axial misalignment between the two components can causes cyclic reading errors. The present invention could be used to precisely align the encoder with the shaft and then rigidly lock the two together.

CONCLUSION

The enablements described in detail above are considered novel over the prior art of record and are considered critical to the operation of at least one aspect of one best node embodiment of the instant invention and to the achievement of the above described objectives. The words used in this specification to describe the instant embodiments are to be understood not only in the sense of their commonly defined meanings, but to include by special definition in this specification; structure, material or acts beyond the scope of the commonly defined meanings. Thus if an element can be understood in the context of this specification as including more that one meaning, then its use must be understood as being generic to all possible meanings supported by the specification and by the work or works describing the element.

The definitions of the words or elements of the embodiments of the herein described invention and its related embodiments not described are, therefore, defined in this specification to include not only the combination of element which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with the reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An alignment system comprising:
    a base having a feature that accepts a first optical element that emits light;
    a first eccentric element having a through hole that accepts an eccentric assembly comprising:
    (a) a second eccentric element having a feature that accepts a second optical element and the second optical element is attached to the second eccentric element via second attachment means; and
    (b) a lens retained inside the second eccentric element through hole wherein the second optical element and the lens form a fixed optical axis for the eccentric assembly;
    wherein
    a. the first eccentric element is engaged with the base via first attachment means;
    b. optical alignment between the first optical element and the fixed optical axis of the eccentric assembly is achieved by rotationally adjusting at least one of the eccentric elements relative to the base; and
    c. optical alignment of the entire alignment system is achieved with no greater than two axis of adjustment.

2. The alignment system of claim 1, wherein the first optical element is a laser diode and the second optical element is an optical fiber.

3. The alignment system of claim 1, wherein the first optical element is selected from a group consisting of optical fiber, laser diode, fiber ferrule containing an optical fiber, a LED, a lens and an optical fiber, a mirror and an optical fiber, and a combination thereof.

4. The alignment system of claim 1, wherein the second optical element is selected from a group consisting of optical fiber, laser diode, fiber ferrule containing an optical fiber, a LED, a lens, a mirror, an optical sensor chip, a holographic optical element, and a combination thereof.

5. The alignment system as in claim 1, wherein the base feature and the second eccentric element are selected from the group consisting of a through hole, a mirror, an optical sensor chip, a holographic optical detector and a combination thereof.

6. The alignment system as in claim 1 wherein the base further includes a temperature sensor.

7. The alignment system as in claim 1 wherein the base further includes a thermo-electric cooler.

8. The alignment system as in claim 1 wherein the first attachment means is selected from a group consisting of: clamping, gluing, welding, soldering, pressing and a combination thereof.

9. The alignment system as in claim 1 wherein the base, the first eccentric element and the eccentric assembly are all secured by a single mechanical clamping mechanism.

10. The alignment system as in claim 1 wherein the first attachment means is an external mechanism that holds the alignment system in an aligned state and provides clamping pressure to the first eccentric element.

11. The alignment system as in claim 1 wherein once the alignment system is aligned, the base, the first optical element, the first eccentric element and the eccentric assembly are all rigidly locked in their aligned positions resulting in a pigtail assembly.

12. The alignment system as in claim 1 wherein the base, the first eccentric element, the second eccentric element are constructed out of material selected from a group consisting of metal, steel alloy, aluminum, bass, ceramic, glass filled epoxy, plastic and a combination thereof.

13. The alignment system as in claim 1 wherein the first eccentric element and the second eccentric element includes gripping means selected from a group consisting of knurled finish, sand blasting overlay, facets for a wrench, polymer overlay and a combination thereof.

14. The alignment system as in claim 1 wherein the second attachment means is a nut wherein the nut engages with threads on outer diameter of the second eccentric element.

15. The alignment system as in claim 14 wherein the nut includes a split section that allows the nut to be placed onto a patch cord with a fiber ferrule on both ends.

16. The alignment system as in claim 1 wherein the second eccentric element through hole includes a reduced diameter section that engages the lens.

17. The alignment system as in claim 1 wherein the lens is a ball lens.

18. An alignment system comprising:
    a base having a first through hole that accepts a first optical element that emits light;
    a first eccentric element having a second through hole that accepts an eccentric assembly, wherein
    (a) the first eccentric element includes an outward lip and an inside surface lip;
    (b) the second through hole includes a first section, a second section, a third section;
    (c) axis of the third section is eccentric with respect to axis of the second section;
    (d) axis of the second section is eccentric with respect to axis of the first section;
    (e) the first eccentric element is engaged with the base via first attachment means comprising:
        (i) a raised collar and a raised outer lip on the base wherein the first section engages the raised collar;
        (ii) a clamp washer having at least two through holes wherein the clamp washer's outer edge engages the raised outer lip and the clamp washer's inner edge engages the outward lip wherein the clamp washer includes an unsupported region between the outer edge and the inner edge; and (iii) clamping bolts run through the clamp washer's through holes exert clamping pressure on the clamp washer causing the first eccentric element to be attached to the base; wherein (f) the first section has an inner diameter that engages with outer diameter of the raised collar and there is sufficient mechanical overlap between the raised collar and the first section to create a physically coupling;

(g) the second section has an inner diameter that engages with outer surface of the eccentric assembly; and (h) the third section has an inner diameter that allows a portion of the eccentric assembly to pass through;

(i) the eccentric assembly is comprising:
  (i) a second eccentric element having a third through hole that accepts a second optical element; and
  (ii) a lens retained inside the third through hole;

(j) the second optical element and the lens form a fixed optical axis for the eccentric assembly;

(k) the second eccentric element is attached to the second optical element via a nut wherein the nut engages with threads on outer diameter of the second eccentric element;

(l) the second eccentric element further includes a nose that fits inside and engages the first through hole;

(m) the nose includes a first nose section with an outer diameter that engages with the second section; and a second nose section with an outer diameter that passes though the second through hole and engages with the inside surface lip;

(n) optical alignment between the first optical element and the fixed optical axis of the eccentric assembly is achieved by rotationally adjusting at least one of the eccentric elements relative to the base; and (o) optical alignment of the entire alignment system is achieved with no greater than two axis of adjustment.

19. The alignment system as in claim 18 wherein the lens is a ball lens and the ball lens is retained inside the third through hole by a retaining ring.

20. The alignment system of claim 18 wherein the raised collar and the outer edge both include threads that can engage each other.

21. The alignment system of claim 18 wherein maximum lateral offset during alignment process will not cause the nose to hit side of the first through hole.

22. The alignment system of claim 18 wherein the first eccentric element and the second eccentric element can freely rotate on the raised collar without rattling.

23. The alignment system of claim 18, wherein the first optical element is a laser diode and the second optical element is an optical fiber.

24. A method for aligning a set of components comprising: providing the alignment system comprising:
  (a) a base having a feature that accepts a first optical element that emits light;
  (b) a first eccentric element having a through hole that accepts an eccentric assembly comprising:
    (i) a second eccentric element having a feature that accepts a second optical element and the second optical element is attached to the second eccentric element via second attachment means; and
    (ii) a lens retained inside the second eccentric element through hole wherein the second optical element and the lens form a fixed optical axis for the eccentric assembly;
  wherein the first eccentric element is engaged with the base via first attachment means; optical alignment between the first optical element and the fixed optical axis of the eccentric assembly is achieved by rotationally adjusting at least one of the eccentric elements relative to the base; and optical alignment of the entire alignment system is achieved with no greater than two axis of adjustment; and
  aligning the alignment system by rotationally adjusting at least one of the eccentric elements relative to the base.

25. The method as in claim 24 wherein the method is used to align components selected from a group consisting of: single mode optical fibers, multimode optical fibers, laser diodes, LEDS, light bulbs, lenses, sensors, holographic optical elements, diffractive optics, diffractive apertures, linear arrays, area arrays, position sensitive detectors, single element detectors, and a combination thereof.

26. A method of making the alignment system of claim 1 comprising: providing a base, a first optical element, a second optical element and an eccentric assembly wherein:
  (a) the base includes a feature that accepts the first optical element;
  (b) the first eccentric element includes a through hole that accepts the eccentric assembly;
  (c) the eccentric assembly includes a lens and a second eccentric element having a feature that accepts a second optical element;
  (d) the lens is retained inside the second eccentric element through hole; and
  (e) the second optical element and the lens form a fixed optical axis for the eccentric assembly;
attaching the base to the first eccentric element via first attachment means;
attaching the eccentric assembly to the second optical element via second attachment means; and
connecting the first eccentric element to the eccentric assembly; wherein optical alignment between the first optical element and the fixed optical axis of the eccentric assembly is achieved by rotationally adjusting at least one of the eccentric elements relative to the base; and optical alignment of the entire alignment system is achieved with no greater than two axis of adjustment.

* * * * *